(12) United States Patent
Hsieh

(10) Patent No.: US 11,747,707 B2
(45) Date of Patent: Sep. 5, 2023

(54) DISPLAY PANEL AND SMART DEVICE

(71) Applicant: BOE TECHNOLOGY GROUP CO., LTD., Beijing (CN)

(72) Inventor: Mingche Hsieh, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 565 days.

(21) Appl. No.: 16/756,138

(22) PCT Filed: Apr. 3, 2019

(86) PCT No.: PCT/CN2019/081179
§ 371 (c)(1),
(2) Date: Apr. 15, 2020

(87) PCT Pub. No.: WO2019/201090
PCT Pub. Date: Oct. 24, 2019

(65) Prior Publication Data
US 2020/0241380 A1 Jul. 30, 2020

(30) Foreign Application Priority Data
Apr. 19, 2018 (CN) .......................... 201810354099.3

(51) Int. Cl.
*G02F 1/29* (2006.01)
*G06F 1/16* (2006.01)
(Continued)

(52) U.S. Cl.
CPC ............ *G02F 1/292* (2013.01); *G02F 1/0311* (2013.01); *G02F 1/133331* (2021.01);
(Continued)

(58) Field of Classification Search
CPC ........... G02F 1/133331; G02F 1/13336; G02F 1/133526; G02F 1/0311; G06F 1/686; G06F 1/605
See application file for complete search history.

(56) References Cited

U.S. PATENT DOCUMENTS

2012/0139964 A1* 6/2012 Han .................... G02F 1/13336
345/87
2014/0218971 A1 8/2014 Wu
(Continued)

FOREIGN PATENT DOCUMENTS

CN 103971600 8/2014
CN 203963677 11/2014
(Continued)

OTHER PUBLICATIONS

Office action from Chinese Application No. 201810354099.3 dated Jul. 29, 2019.

*Primary Examiner* — Jessica M Merlin
(74) *Attorney, Agent, or Firm* — Calfee, Halter & Griswold LLP

(57) ABSTRACT

The present disclosure discloses a display panel and a smart device. The display panel includes a first display area and a second display area adjacent to each other. Further, the display panel further includes a display substrate, a lens on the display substrate, and a transparent cover plate covering the lens and the display substrate. The display substrate includes a first display portion in the first display area and a second transparent portion in the second display area. The lens is configured to emit a part of the light from the first display portion from the second display area.

18 Claims, 2 Drawing Sheets

(51) Int. Cl.
  *G02F 1/1333* (2006.01)
  *G02F 1/03* (2006.01)
  *G02F 1/1335* (2006.01)
  *G02B 3/06* (2006.01)

(52) U.S. Cl.
  CPC ...... *G02F 1/133526* (2013.01); *G06F 1/1605* (2013.01); *G06F 1/1686* (2013.01); *G02B 3/06* (2013.01); *G02F 2201/58* (2013.01); *G02F 2203/01* (2013.01)

(56) References Cited

U.S. PATENT DOCUMENTS

| | | | |
|---|---|---|---|
| 2016/0370644 A1* | 12/2016 | Wang | G02F 1/133526 |
| 2017/0082784 A1 | 3/2017 | Niu | |
| 2020/0241380 A1 | 7/2020 | Hsieh | |

FOREIGN PATENT DOCUMENTS

| | | |
|---|---|---|
| CN | 105321429 | 2/2016 |
| CN | 107229148 | 10/2017 |
| CN | 107240358 | 10/2017 |
| CN | 108550325 | 9/2018 |
| JP | 2004274365 | 9/2004 |

\* cited by examiner

DISPLAY PANEL AND SMART DEVICE

CROSS-REFERENCE TO RELATED APPLICATIONS

The present application is a 35 U.S.C. 371 national stage application of PCT International Application No. PCT/CN2019/081179, filed on Apr. 3, 2019, which claims the benefit of Chinese Patent Application No. 201810354099.3, filed on Apr. 19, 2018, the entire disclosures of which are incorporated herein by reference.

FIELD

The present disclosure relates to the field of display technologies, and particularly to a display panel and a smart device.

BACKGROUND

With the progress of society and the continuous improvement of living levels, people's requirements for smart devices are also increasing. A wide range of smart devices on the market make people's lives easier and faster, and are very convenient, and they are also increasingly used in people's lives.

Smart devices such as a smartphone typically have display panels. However, at present, on the front panel of a mobile phone, assemblies such as a camera and a sensor are often required to be arranged outside the display area. This directly results in that the screen-to-body ratio of the mobile phone cannot be further increased. The same is true for other smart devices. In order to increase the screen-to-body ratio, the industry urgently needs a display panel that can also display images in the camera area.

SUMMARY

According to one aspect of the present disclose, a display panel is provided. The display panel comprises a first display area and a second display area adjacent to each other. The display panel further comprises a display substrate, a lens on the display substrate, and a transparent cover plate covering the lens and the display substrate. The display substrate comprises a first display portion in the first display area and a second transparent portion in the second display area. The lens is configured to emit a part of the light from the first display portion from the second display area.

According to a specific implementation, in the display panel provided by the present disclosure, the lens comprises a convex lens that partially covers the first display portion and completely covers the second transparent portion.

According to a specific implementation, in the display panel provided by the present disclosure, the convex lens has a semi-cylindrical shape.

According to a specific implementation, in the display panel provided by the present disclosure, the second display area is near an edge of the display panel.

According to a specific implementation, in the display panel provided by the present disclosure, the transparent cover plate comprises an edge portion in the second display area and having a slope shape.

According to a specific implementation, in the display panel provided by the present disclosure, with respect to an extension plane of the display substrate, the edge portion has an inclination angle less than 40 degrees.

According to a specific implementation, in the display panel provided by the present disclosure, a size of the second transparent portion is less than 5 mm.

According to a specific implementation, the display panel provided by the present disclosure further comprises a light sensor disposed on a side of the second transparent portion away from the transparent cover plate.

According to a specific implementation, the display panel provided by the present disclosure further comprises a distance sensor disposed on a side of the second transparent portion away from the transparent cover plate.

According to another aspect of the present disclose, a smart device is also provided. The smart device comprises the display panel according to any of the previous embodiments; and a camera disposed on a side of the second transparent portion away from the transparent cover plate.

Additional aspects and advantages of the present disclosure will be partially given in the following description, and these will become apparent from the following description, or be learned through the practice of the present disclosure.

BRIEF DESCRIPTION OF THE DRAWINGS

The above and/or additional aspects and advantages of the present disclosure will become apparent and easily understood from the following description of the embodiments with reference to the accompanying drawings, in which.

DETAILED DESCRIPTION

Figure 1:
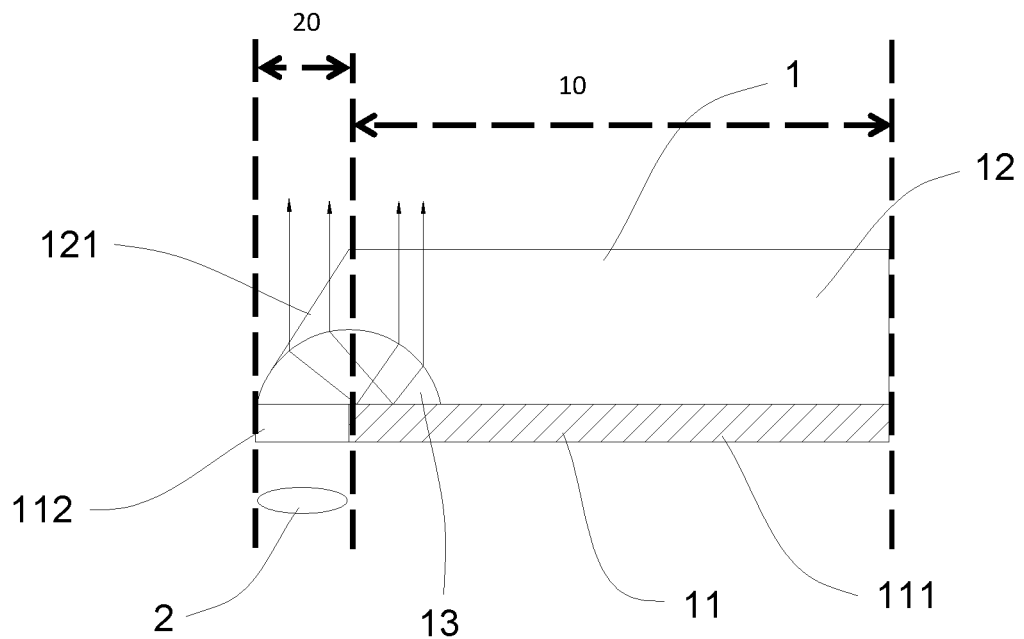
FIG. 1 is a side view of a display panel according to an embodiment of the present disclosure, in which arrows indicate paths of display light from a first display portion and exiting from a second display area through a convex lens.

Embodiments of the present disclosure are described in detail below. An example of the embodiment is shown in the drawings, in which the same or similar elements or elements having the same or similar functions are denoted by the same or similar reference numerals throughout. The embodiments described below with reference to the drawings are exemplary and are only used to explain the present disclosure, and cannot be interpreted as limiting the present disclosure.

Those skilled in the art can understand that unless specifically stated otherwise, the wording "comprise" used in the specification of the present disclosure refers to the presence of said features, integers, steps, operations, parts/assemblies and/or components, but does not exclude the presence or addition of one or more other features, integers, steps, operations, parts/assemblies, components, and/or groups thereof. It should be understood that, when we say that a part/assembly is "connected" to another part/assembly, it may be directly connected to another part/assembly, or there may be intermediate parts/assemblies. As used herein, the wording "and/or" comprises any one or all of one or more of the associated listed items and all combinations thereof.

Embodiments of the present disclosure provide a display panel, which is particularly partially transparent. Specifically, the display panel is provided with a partially transparent area, and a camera or a sensor that detects based on light is provided below the transparent area. In this way, on one hand, the normal operation of the camera and sensor is ensured; on the other hand, a display image can be projected onto the partially transparent area through an additional convex lens, so that the partially transparent area can also display an image.

Figure 2:
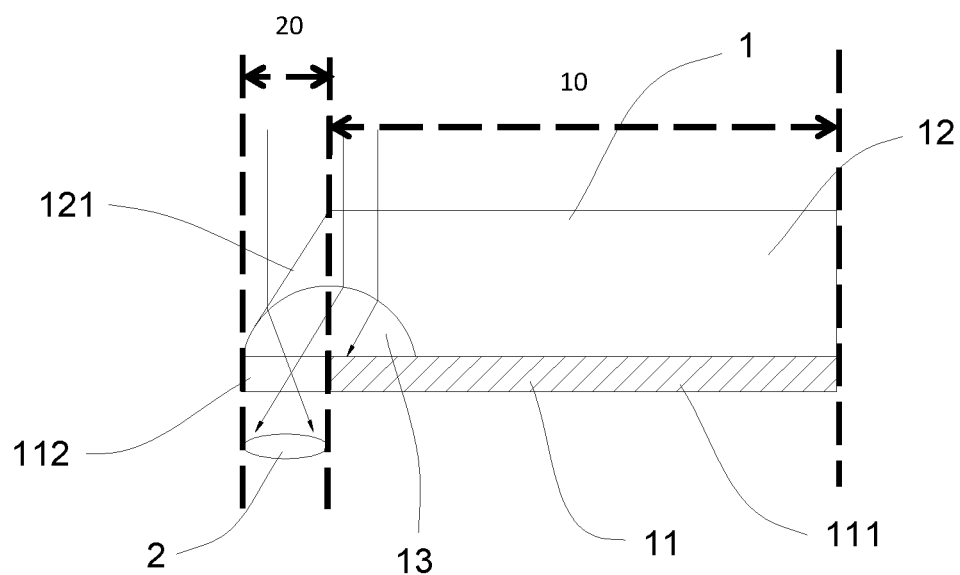
FIG. 2 is a schematic diagram of a light path where external light is incident on the display panel shown in FIG. 1, where arrows indicate a propagation direction of external light.

As shown in FIGS. 1 and 2, the display panel 1 comprises a first display area 10 and a second display area 20 which are adjacent to each other. Optionally, the first display area 10 may be an area near the bottom edge of the display panel 1, and the second display area 20 may be an area near the top edge of the display panel 1. In addition, from the perspective of the hierarchical structure, the partially transparent display panel 1 comprises a display substrate 11 and a transparent cover plate 12 on the display substrate 11. Moreover, the display substrate 11 further comprises a first display portion 111 in the first display area 10 and a second transparent portion 112 in the second display area 20. In such a case, if the display panel 1 is applied to a smart device (for example, a mobile phone), the camera 2 may be provided behind the second transparent portion 112 (that is, a side away from the transparent cover plate 12). Thus, the external light can be received by the camera through the second transparent portion, thereby forming an image.

Further, a lens 13, in particular a convex lens 13 is provided on the display substrate 11, so that a part of the light from the first display portion 111 is emitted from the second display area 20. As an example, the convex lens 13 completely covers the second transparent portion 112 and partially covers the first display portion 111. Moreover, the convex lens 13 may also be designed in a semi-cylindrical shape. As shown in FIG. 1, the display light or display image from the first display area can be emitted from the second display area after being refracted by the convex lens 13, so as to achieve display in the second display area 20. That is, although the first display portion 111 is only in the first display area 10, the light from the first display portion 111 can also be emitted from above the first transparent portion 112 due to the existence of the convex lens 13 described above. That is, an image display may also exist in the second display area 20.

Optionally, in the display panel 1, the second display area 20 is close to an edge of the display panel 1, for example, the left edge in FIG. 1. At this time, the transparent cover plate 12 may comprise an edge portion 121 in the second display area 20. In particular, the edge portion 121 has a slope shape. In the embodiment of the present disclosure, as an example, such an edge portion 121 has an inclination angle with respect to an extension plane of the display substrate, such as an inclination angle less than 40 degrees. In this way, unlike the light path of external light passing through the first display area 20 and entering the camera 2 below, the display light from the first display portion 111 and emitted from the second display area 20 will have a different light path. Thereby, the adverse effects generated between the two light paths can be effectively avoided, and a user is not easily affected by the rear camera 2 when viewing the display panel.

Optionally, the size of the second transparent portion 112 may be less than 5 mm. For example, in an embodiment, the second transparent portion 112 may be disposed near an edge of the display panel 1, and the width of the second transparent portion 112 may be less than 5 mm in a direction perpendicular to the edge. In this way, it is possible to avoid problems such as image distortion due to an excessively large position occupied by the second display area, or large color differences of images displayed by two display areas in the display panel.

Figure 3:
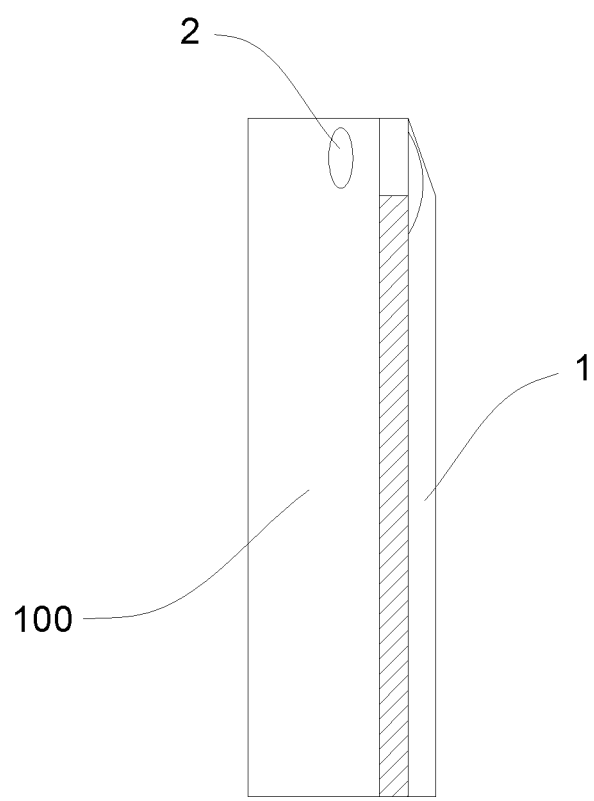
FIG. 3 is a side view of a smart device according to an embodiment of the present disclosure.

On the other hand, as shown in FIG. 3, the present disclosure also relates to a smart device 100. Specifically, the smart device 100 may comprise the above-mentioned partially transparent display panel 1 and a camera 2 disposed below the second display area 20 (that is, a side of the second transparent portion 112 away from the transparent cover plate 12). Since the use of the partially transparent display panel 1, the above-mentioned smart device 100 may have a further increased screen-to-body ratio. This means that it is no longer necessary to reserve an area to arrange the camera 2 other than the screen on the front panel of the smart device. On the contrary, according to the embodiment of the present disclosure, the camera 2 may be disposed directly behind the second transparent portion 112. In such a case, the second display area 20 can also display an image by projection of the convex lens 13. Moreover, the transparent cover plate 12 has a sloped edge portion 121. In this way, the light emitted from the display panel 1 and the light entering the camera from the outside have different propagation paths, so that they can avoid any adverse effects on each other, and at the same time, the user cannot see that camera 2 arranged behind the second transparent portion 112, when he/she is watching the display panel 1.

In other words, according to an embodiment of the present disclosure, by dividing the display panel 1 of the smart device 100 into two display areas (i.e., the first display area 10 and the second display area 20), and making both display areas can display images, realizes the full-screen design of the display panel of the smart device, increases the screen-to-body ratio, meets the needs of users, and improves the user experience.

Optionally, the display panel 1 may further comprise a light sensor disposed behind the second transparent portion 112 (that is, a side away from the transparent cover plate 12). Specifically, the light sensor is connected to the CPU of the smart device for detecting the brightness of ambient light around the smart device. In this way, the CPU can output corresponding control instructions to adaptively adjust the brightness of the display panel 1 according to the detection result of the light sensor, so as to bring better visual effects to the user, and at the same time can achieve the purpose of power saving.

Optionally, the display panel 1 may further comprise a distance sensor disposed behind the second transparent portion 112 (i.e., a side away from the transparent cover plate 12). Specifically, the distance sensor is used to detect a distance between a display panel and a user (particularly, a user's face). The distance sensor is also connected to the CPU, so that the CPU can perform corresponding control according to the distance between the display panel and the user detected by the distance sensor. Such control is, for example, turning off the backlight of the display panel and implementing a screen lock when a person's face is close to the display panel when receiving or making a call. In this way, it is possible to prevent a human face from inadvertently touching the display panel to affect the call process and quality, and also achieve the purpose of saving power. In addition, the control may also comprise automatically turning on the display panel when the face leaves the display panel.

By providing a light sensor and a distance sensor below the second transparent portion 112 in the second display area 20, the space in the second display area 20 can be fully utilized. Therefore, while further increasing the practical functions of said smart device 100, the screen-to-body ratio of the front panel of the smart device 100 will not be reduced, thereby further improving the user experience.

It should be noted that, the smart device mentioned in the embodiments of the present disclosure may include, but is not limited to, a laptop, a mobile phone, a tablet, a handheld game console, and the like.

What has been described above are only part of the embodiments of the present disclosure. It should be noted that, for those of ordinary skill in the art, without departing from the principles of the present disclosure, several improvements and retouches can be made, and all these improvements and retouches should also be deemed to fall within the scope of protection of this disclosure.

The invention claimed is:

1. A display panel, comprising a first display area and a second display area adjacent to each other, wherein
the display panel further comprises a display substrate, a lens on the display substrate, a transparent cover plate covering the lens and the display substrate, and a light sensor, wherein
the display substrate comprises a first display portion in the first display area and a second transparent portion in the second display area,
the lens is configured to make a part of the light from the first display portion to exit from the second display area, and
the light sensor is disposed on a side of the second transparent portion away from the transparent cover plate.

2. The display panel according to claim 1, wherein
the lens comprises a convex lens that partially covers the first display portion and completely covers the second transparent portion.

3. The display panel according to claim 2, wherein
the convex lens has a semi-cylindrical shape.

4. The display panel according to claim 1, wherein
the second display area is near an edge of the display panel.

5. The display panel according to claim 4, wherein
the transparent cover plate comprises an edge portion in the second display area and having a slope shape.

6. The display panel according to claim 5, wherein
with respect to an extension plane of the display substrate, the edge portion has an inclination angle less than 40 degrees.

7. The display panel according to claim 1, wherein
a size of the second transparent portion is less than 5 mm.

8. The display panel according to claim 1, further comprising:
a distance sensor disposed on the side of the second transparent portion away from the transparent cover plate.

9. A smart device, comprising:
a display panel, wherein the display panel comprises a first display area and a second display area adjacent to each other, a display substrate, a lens on the display substrate, and a transparent cover plate covering the lens and the display substrate, the display substrate comprises a first display portion in the first display area and a second transparent portion in the second display area, and the lens is configured to make a part of the light from the first display portion to exit from the second display area; and
a camera disposed on a side of the second transparent portion away from the transparent cover plate.

10. The smart device according to claim 9, further comprising:
a light sensor disposed on the side of the second transparent portion away from the transparent cover plate.

11. The smart device according to claim 10, further comprising:
a distance sensor disposed on the side of the second transparent portion away from the transparent cover plate.

12. The smart device according to claim 9, further comprising:
a distance sensor disposed on the side of the second transparent portion away from the transparent cover plate.

13. The smart device according to claim 9, wherein the lens comprises a convex lens that partially covers the first display portion and completely covers the second transparent portion.

14. The smart device according to claim 13, wherein the convex lens has a semi-cylindrical shape.

15. The smart device according to claim 9, wherein the second display area is near an edge of the display panel.

16. The smart device according to claim 15, wherein the transparent cover plate comprises an edge portion in the second display area and having a slope shape.

17. The smart device according to claim 16, wherein with respect to an extension plane of the display substrate, the edge portion has an inclination angle less than 40 degrees.

18. The smart device according to claim 9, wherein a size of the second transparent portion is less than 5 mm.

* * * * *